(12) United States Patent
Garden

(10) Patent No.: US 11,135,535 B2
(45) Date of Patent: Oct. 5, 2021

(54) FILTER

(71) Applicant: Rig Deluge Global Limited, Aberdeen (GB)

(72) Inventor: Ian Garden, Aberdeen (GB)

(73) Assignee: Rig Deluge Global Limited, Aberdeen (GB)

( * ) Notice: Subject to any disclaimer, the term of this patent is extended or adjusted under 35 U.S.C. 154(b) by 0 days.

(21) Appl. No.: 15/301,536

(22) PCT Filed: Apr. 7, 2015

(86) PCT No.: PCT/GB2015/051056
§ 371 (c)(1),
(2) Date: Oct. 3, 2016

(87) PCT Pub. No.: WO2015/150836
PCT Pub. Date: Oct. 8, 2015

(65) Prior Publication Data
US 2017/0028325 A1    Feb. 2, 2017

(30) Foreign Application Priority Data

Apr. 4, 2014 (GB) .................................. 1406174
Apr. 30, 2014 (GB) .................................. 1407584

(51) Int. Cl.
*B01D 35/02* (2006.01)
*A62C 31/02* (2006.01)
(Continued)

(52) U.S. Cl.
CPC ............ *B01D 35/02* (2013.01); *A62C 31/005* (2013.01); *A62C 31/02* (2013.01); *A62C 35/68* (2013.01);
(Continued)

(58) Field of Classification Search
CPC ....... A62C 31/005; A62C 31/02; A62C 35/58; A62C 35/68; B05B 1/34; B05B 15/40;
(Continued)

(56) References Cited

U.S. PATENT DOCUMENTS 1,563,490 A    12/1925  Spencer
2,493,982 A *   1/1950  Lee ..................... A62C 31/005
                                                          169/37
(Continued)

FOREIGN PATENT DOCUMENTS

CN         1408481 A       4/2003
CN         2613319         4/2004
(Continued)

*Primary Examiner* — Cody J Lieuwen
(74) *Attorney, Agent, or Firm* — Dorton & Willis LLP; Ryan Willis

(57) ABSTRACT

The present invention discloses a filter comprising a tube extending from a first end to a second end and having a bore with an internal cross-sectional area. The tube comprises an inlet with an inlet cross-sectional area which is positioned through the first end of the tube. The tube also comprises an outlet with an outlet cross-sectional area, wherein the inlet cross-sectional area is less than the outlet cross-sectional area and so debris small enough to enter the inlet will tend not to block the outlet, which is larger. The filter further comprises a plurality of further inlets, often slots, in the tube between an outside thereof and the bore. In a preferred embodiment, the first end may be tapered and especially dome shaped. This helps to direct debris towards an outside of the tube, where it is less likely to be drawn into the filter and potentially block it or a downstream component, such as a nozzle. The filter may be attached to a pipeline and a nozzle.

23 Claims, 11 Drawing Sheets

(51) Int. Cl.
*A62C 35/68* (2006.01)
*F23K 5/18* (2006.01)
*A62C 31/00* (2006.01)
*B05B 15/40* (2018.01)
*B01D 29/92* (2006.01)

(52) U.S. Cl.
CPC .............. *B01D 29/92* (2013.01); *B05B 15/40* (2018.02); *F23K 5/18* (2013.01)

(58) Field of Classification Search
CPC ...... B01D 29/33; B01D 29/92; B01D 29/117; B01D 35/02; B01D 35/023; F16L 35/005
USPC ........... 169/37–41, 90; 239/575, 590, 590.3; 210/459, 460, 461, 463; 138/103
See application file for complete search history.

(56) References Cited

U.S. PATENT DOCUMENTS

| | | | |
|---|---|---|---|
| 3,273,805 | A | 9/1966 | Hall |
| 3,672,578 | A | 6/1972 | Wayne |
| 4,848,672 | A | 7/1989 | Matsumoto et al. |
| 5,087,355 | A * | 2/1992 | Godec ................. B01D 29/114 210/136 |
| 5,392,993 | A * | 2/1995 | Fischer ................. A62C 31/02 169/38 |
| 5,839,667 | A * | 11/1998 | Fishcer ................. A62C 31/02 239/498 |
| 6,450,266 | B1 | 9/2002 | Pahila |
| 9,833,804 | B2 | 12/2017 | Garden |
| 2002/0040868 | A1 | 4/2002 | Lockwood |
| 2002/0096580 | A1 | 7/2002 | Pahila |
| 2003/0052199 | A1 * | 3/2003 | Ikeuchi ................... B05B 1/042 239/550 |
| 2005/0156064 | A1 | 7/2005 | Tanigaki |
| 2007/0241214 | A1 | 10/2007 | Beer |
| 2008/0283635 | A1 * | 11/2008 | Fecht ...................... B05B 1/042 239/590 |
| 2008/0290197 | A1 | 11/2008 | Fecht et al. |
| 2009/0272826 | A1 * | 11/2009 | Kioi ........................ B05B 1/042 239/601 |
| 2009/0294341 | A1 * | 12/2009 | Beer ..................... A01G 25/023 210/111 |
| 2010/0252282 | A1 * | 10/2010 | Sarkisyan .............. A62C 35/68 169/37 |
| 2011/0110811 | A1 | 5/2011 | Fecht et al. |

FOREIGN PATENT DOCUMENTS

| | | |
|---|---|---|
| CN | 2015800185621 | 12/2018 |
| CN | 2015800185621 | 8/2019 |
| EA | 201691902 | 12/2018 |
| EP | 1992415 | 11/2008 |
| EP | 18166417.8 | 7/2018 |
| EP | 18166417.8 | 9/2019 |
| FR | 2229211 | 1/1975 |
| GB | 2211439 | 7/1989 |
| GB | 1406174.1 | 10/2014 |
| GB | 1407584.0 | 11/2014 |
| ID | P-00201607419 | 1/2019 |
| JP | 2013-146723 | 8/2013 |
| WO | 2014/009713 | 1/2014 |
| WO | 2014009714 | 1/2014 |
| WO | 2015150836 | 7/2015 |

* cited by examiner

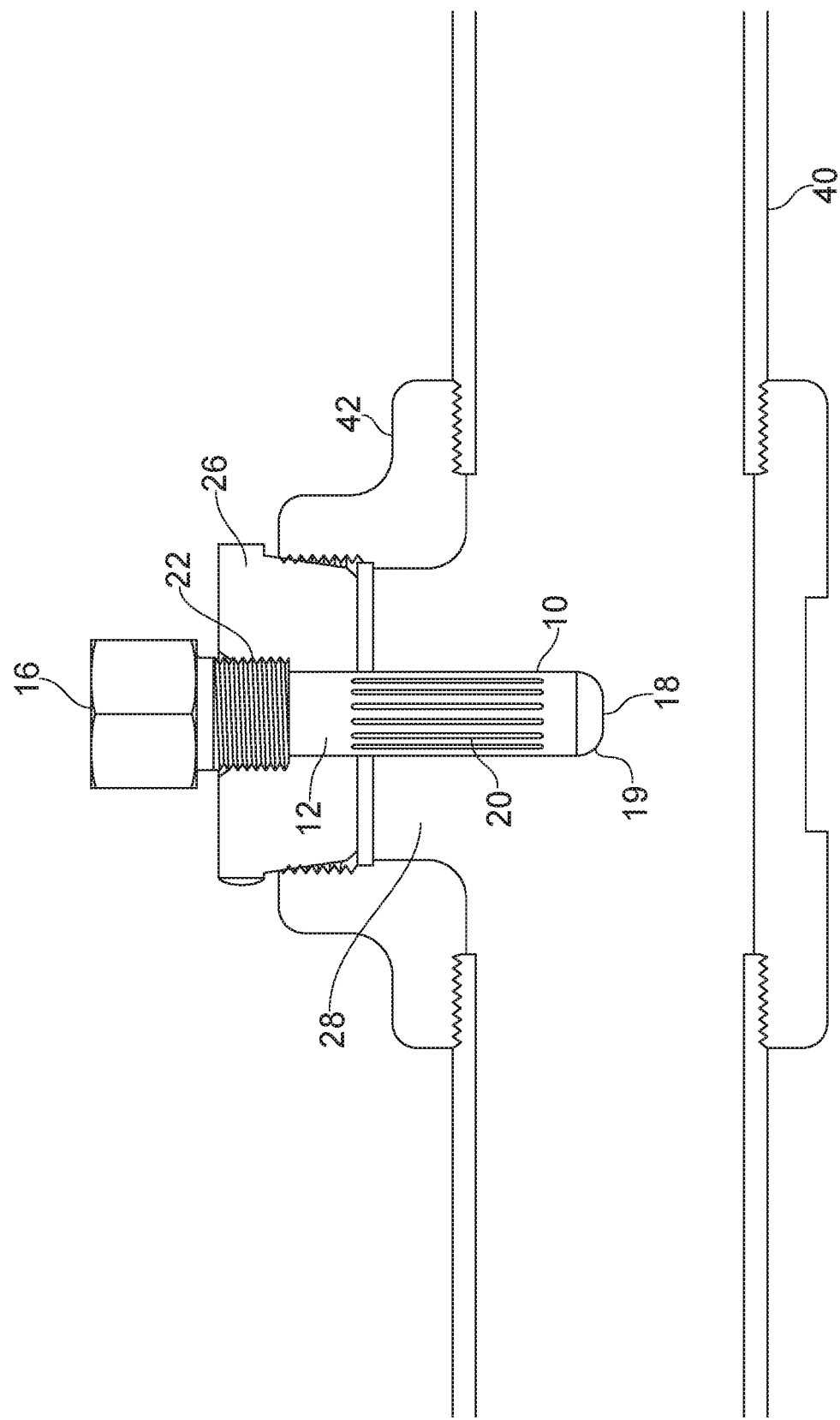

FILTER

This invention relates to a filter particularly but not exclusively as part of, or for a nozzle connected to a pipeline.

Fluid flow systems, such as sprinkler systems are widely used in onshore and offshore installations, such as oil and gas platforms, to contain or suppress fire. During operation of the sprinkler system, it is likely that scale, debris and other pollutants will build up and become a problem. Scale is typically formed by the precipitation of mineral compounds from water, such as calcium carbonate or calcium sulphate, due to pressure and/or temperature changes in the pipeline. Corrosion in pipelines can build up along the inner wall of pipe and also results in debris entering the system. Marine growth can also cause blockage problems. Salts can also crystallise and cause blockage problems.

It is a regular occurrence for nozzles of sprinkler systems to block due to this build-up, and this can cause the whole system to become redundant. If such nozzles become blocked, the ability of the sprinkler system to contain or suppress a fire could be severely impeded. This could hinder the safe escape of platform personnel.

Other fluid flow systems such as burner heads can also suffer from a variety of debris which inhibits flow.

Debris can pose a problem if it is distributed outwith the sprinkler system. Fluid is typically ejected from the exit point at high velocities and any debris present can cause injury to personnel. It has been known to cut faces and has the potential to cause serious eye injuries.

Traditional means to tackle the presence of scale, or other debris which can potentially block the nozzle or cause injuries, include an upstream screen which blocks larger particles. However this is still unsatisfactory partly because the screens themselves become blocked and inhibit or prevent fluid coming through the exit point of the fluid system, such as a sprinkler.

WO2014/009713 describes a nozzle apparatus with an entry segregator 22 having an axial passage 12. Slots 25 in the entry segregator 22 provide additional filtration capacity to other components described therein.

WO2014/009714 describes a nozzle system comprising a nozzle apparatus in fluid communication with a pipeline. The nozzle apparatus comprises a first and second inlet and an outlet. The nozzle apparatus extends into the pipeline such that a portion of the first inlet is in the centre of the pipeline. This can reduce the likelihood of the nozzle apparatus becoming blocked due to the build-up of debris on the inner edge of the pipeline.

Whilst generally satisfactory, the inventor of the present invention has developed an improved filter. Thus, an object of the present invention is to further mitigate the problem of blockages.

According to a first aspect of the present invention, there is provided a filter comprising:
- a tube extending from a first end to a second end, the tube having a bore with an internal cross-sectional area;
- an inlet to the tube, the inlet being positioned through the first end of the tube and the inlet having an inlet cross-sectional area;
- an outlet from the tube the outlet having an outlet cross-sectional area;
- a plurality of further inlets in the tube between an outside thereof and the bore;
- wherein the inlet cross-sectional area is less than the outlet cross-sectional area.

The first end may be tapered and especially dome shaped. That is, the centre of the first end (often perimeter of the end inlet) may extend longitudinally further than an outer portion of the first end. In this way, debris is in use directed towards an outside of the tube, where it is less likely to be drawn into the filter and potentially block it or a downstream component, such as a nozzle.

The further inlets may be slots. The further inlets may extend generally parallel (+/−10 degrees) to the (normally longitudinal) direction from the first to the second end.

The number of further inlets depends on the diameter of the filter. There is normally at least 8 further inlets, and for a 0.5" diameter filter, there are normally up to 20 further inlets.

For embodiments especially according to the first aspect of the invention, the further inlets normally have a width of 1-3 mm or 1.5-2.5 mm. The spacing between the further inlets is normally between 50% and 150% larger than the width of the further inlets. For example the further inlets may be 1 mm width, and spaced apart by 2 mm.

The length of the further inlets can vary depending on the application of the filter e.g. the size of a pipe to which it may be attached but is normally at least 1.5 cm, optionally at least 2 cm, or normally for larger pipes, more than 3 cm. They may extend up to 10 cm or up to 8 cm, although this largely depends on the size of the pipe to which they are attached.

Alternatively, the further inlets may extend for more than 4 cm and optionally up to 6 cm.

The further inlets may extend for up to 75% or up to 50% of the length of the tube. The further inlets may extend for a portion of the tube between the first end and the middle of the tube.

The tube may be circular in cross-section. Preferably the tube extends longitudinally. The outlet may be at the second end.

The internal cross-sectional area of the tube is normally taken at the narrowest internal point in the tube. However, preferably the internal cross-section of the tube is the same along the majority if not all of its length, such as at least 75%, or at least 90 or 95% of its length.

Said internal cross-sectional area of the tube normally has a height to width ratio of at most 2:1, normally 1.5:1, 1.1:1 or equal i.e. 1:1. It is normally circular.

The inlet cross-sectional area may be at least 75%, preferably at least 90% and ideally 100%, of the internal cross-sectional area. This assists in maintaining pressure and flow rate in the filter in use.

The tube may be 2-4 inches long.

The filter is normally for a pipeline. The filter normally has a mounting means for mounting to the pipeline in use. This may be a clip, threaded body (especially outer body), a snap-fit connection or other suitable device. A threaded outer body is preferred. This may be provided around the tube, with a wider outer diameter compared to the tube. It is normally provided adjacent the end.

The tube, especially at the outlet end, normally comprises a second mounting means, normally on the inside, for mounting a nozzle thereto. For example a threaded bore.

Whilst the filter described herein may be suitable for a variety of applications which require clear flow of fluid, it is preferred for use in pipelines, especially as a nozzle for a pipeline. For example, a burner head for flaring oil or gas, water delivery lines, especially a sprinkler system for fire-fighting or fire containment.

According to a second aspect of the invention, there is provided a pipeline comprising a pipe, and the filter as described herein.

Thus the filter extends into the pipeline. In use, it can filter debris from entering which can mitigate the blockages or reduce the number of blockages, experienced downstream, such as in a nozzle.

A reducing bush may be used to size the filter into a suitable socket in the pipeline. A wider diameter coupling (compared to the pipe) may also be provided between an end of the pipe and the outer body or reducing bush.

Preferably the length of the tube, is longer, and this extends beyond any reducing bush.

This is especially useful for filters installed at elbow and/or T-joints.

Alternatively, a weld-o-let fitting may be used.

The portion of the tube adjacent the reducing bush, or weld-o-let, is preferably substantially solid—the slots extending in a portion of the tube outwith this area. This can improve the mechanical mounting. For example, at least 75% of this area may be free from slots or at least 95%.

The filter may be added to an end of the pipeline, and extend therein, substantially parallel (+/−10 degrees) to the main longitudinal axis of the pipeline. Alternatively, it may be provided at an angle such as substantially at a right angle (+/−10 degrees) to the main longitudinal axis of the pipeline. In the latter case, the first end (including the end inlet where provided) extends into the central 10% of the pipeline, that is +/−10% of the inner diameter of the pipeline around the central axis. Optionally +/−5%. The end may not be in the exact centre. It has been found especially useful to be 3-4% or 3-5% off-centre, that is spaced by such a proportion away from the main longitudinal axis based on the internal diameter of the pipeline. For elbow joins it is preferred to be slightly above the central axis, for other joins, slightly below.

The filter described herein may be provided as a single piece and in use also functions as an adaptor to attach a nozzle to a pipeline or indeed for other purposes, such as at a join between two pipes For example between a larger (e.g. 2") pipe to smaller (e.g. 0.5") pipe to protect the pipe bore.

The outlet described herein is normally the outlet of the tube, before any nozzle portion, or attached nozzle.

However, where a nozzle is included, or attached, preferably the cross-sectional area of the end inlet is +/−20% of the total cross-sectional area of the outlet of the nozzle, normally +/−10% or +/−5%. But preferably the end inlet is no larger than the nozzle outlet. In this way, any debris which is small enough to proceed through the end inlet, will not be large enough to block the nozzle outlet.

Thus an advantage of such embodiments is that they may be used with a variety or new or conventional nozzles. Alternatively, it may be provided together with a nozzle, either formed as one piece or otherwise connected and sold to the end user as a single item.

The pipe may have an inner diameter from 0.5" optionally more than 0.75" or more than 1". Certain embodiments may be up to 3.5", up to 3" or up to 2".

Thus, according to a third aspect of the invention, there is provide a nozzle apparatus, comprising a nozzle and the filter described herein.

Preferably the bore of the nozzle, especially the outlet of the nozzle, is not reduced by the combination of the filter and the nozzle. Accordingly, the filter may be sized such that the bore of the nozzle, especially the outlet of the nozzle, is not reduced in size when combined with the filter.

According to a fourth aspect of the present invention, there is provided a nozzle apparatus, comprising:

a filter comprising a tube extending from a first end to a second end, the tube having a bore with an internal cross-sectional area;
an inlet to the tube, the inlet being positioned through the first end of the tube and the inlet having a first inlet cross-sectional area;
an outlet from the tube the outlet having an outlet cross-sectional area;
a plurality of further inlets in the tube between an outside thereof and the bore;
a nozzle with a nozzle outlet, the nozzle outlet having a nozzle outlet cross-sectional area
wherein the inlet cross-sectional area of the filter is smaller than the outlet cross-sectional area of the nozzle.

According to a fifth aspect of the present invention, there is provided a filter comprising:

a tube extending from a first end to a second end, the tube having a bore with an internal cross-sectional area;
a side inlet to the tube, the side inlet having a side inlet cross-sectional area;
an outlet from the tube;
a plurality of further inlets in the tube between an outside thereof and the bore;
wherein the side inlet cross-sectional area is at least 75% of the internal cross-sectional area;
and wherein the side inlet is provided through a side face of the tube, between the first and second ends.

Thus filters in accordance with the fifth aspect of the present invention require a side inlet whereas earlier aspects of the invention do not. Accordingly, there are distinct embodiments of the invention—those with a side inlet as described herein, and those without.

The pipeline of the second aspect of the invention and nozzle apparatus according to the third and/or fourth aspect of the inventions, can include a filter according to the fifth aspect of the invention optionally in place of the filter according to the first aspect of the invention.

Thus advantages can be derived from filters in accordance with the fifth aspect of the present invention. First, the inlet cross-sectional area is at least 75%, preferably at least 90% and ideally 100%, of the internal cross-sectional area. This assists in maintaining pressure and flow rate in the filter in use.

Second, given the side inlet is on a side face of the tube, debris in the pipeline in use, is less likely to enter the filter and block it.

The tube has a main longitudinal axis (parallel to the main direction of fluid flow in use); and the side inlet is provided in an inlet plane; the inlet plane is normally at an angle of −20 degrees to +20 degrees to the main longitudinal axis of the tube. Preferably it is −10 degrees to +10 degrees or ideally essentially parallel.

The outlet of the tube may have an outlet plane, and the inlet plane may be at an angle of 70-110 degrees relative to the outlet plane. Optionally 80-100 degrees and ideally around 90 degrees, relative to the outlet plane.

Where the side inlet is thus provided along its circular outer face, the inlet plane is one extending through three points on the perimeter of the at least one inlet. The end inlet and outlet may be defined in the same manner if required.

The at least one side inlet may be provided closer to the first end than the second (normally outlet) end.

The cross-sectional area of the side inlet normally has a height to width ratio of at most 2:1, normally 1.5:1, 1.1:1 or equal i.e. 1:1. It is normally circular.

Preferably the diameter of the side inlet is least 75% of the diameter of the internal cross-section, preferably at least 90% and ideally 100%.

As for the first aspect of the invention, the tube may comprise a second, normally end, inlet having a cross-sectional diameter smaller than the side inlet. The end inlet may be through the first end (rather than through a side face) of the tube. Normally the end inlet has a cross-sectional area smaller than an outlet cross-sectional area.

The cross-sectional area of the tube is normally the same shape as the side inlet.

Especially for embodiments in accordance with the fifth aspect of the invention there is normally at least 8 further inlets, optionally at least 20 or more than 30 further inlets. The further inlets normally have a width of 1-4 mm or 1-2 mm. The spacing between the further inlets is normally the same (+/−up to 20%) as the width of the further inlets. For example the further inlets may be 1 mm width, and spaced apart by 1 mm.

Required and optional features of the filter in accordance with the earlier, especially the first aspect, of the present invention which are not part of the fifth aspect of the invention, are considered as optional features for the filter in accordance with the fifth aspect of the invention.

In particular, the first end may be tapered, especially dome shaped. That is, the centre of the first end (often perimeter of the end inlet) may extend longitudinally further than an outer portion of the first end.

An indicator may be provided, such as at the second end, which allows a user to know the position of the at least one side inlet, which may be concealed by the surrounding pipeline.

Thus debris which is large enough to enter the at least one side inlet, tends not to enter the filter because the largest inlet (the side inlet), can be faced away from the main flow direction of the fluid.

According to a sixth aspect of the invention there is provided a method of installing a filter as described herein, into a pipeline, such that the at least one side inlet does not face the flow of fluid through the pipeline.

Preferably it is orientated at 80-100 degrees to the flow of fluid in the pipeline. Alternatively, it may be opposite the flow of fluid in the pipeline. Said flow of fluid is the main direction of the fluid flow in the pipeline.

According to a seventh aspect of the present invention, there is provided a filter comprising:
  a tube extending from a first end to a second end; the tube having a bore with an internal cross-sectional area and a main longitudinal axis;
  a side inlet to the tube, the side inlet having a side inlet cross-sectional area and provided in an inlet plane;
  an outlet from the tube, the outlet having an outlet cross-sectional area and provided in an outlet plane;
  a plurality of further inlets in the tube between an outside thereof and the bore;
  wherein the side inlet cross-sectional area is at least 75% of the internal cross-sectional area;
  and wherein the inlet plane is at an angle of −20 degrees to +20 degrees to the main longitudinal axis of the tube.

The filter according to the seventh aspect of the invention may independently comprise the features described herein with respect to the filter according to the fifth aspect of the invention.

Embodiments of the present invention will now be described, by way of example only, with reference to the accompanying figures, in which:

FIG. 5 shows a filter arranged in a pipeline connected with a T-junction connector;

FIGS. 1 and 2 show a side and three-dimensional view of a distinct embodiment of a filter 10 in accordance with one aspect of the present invention.

Figure 1:
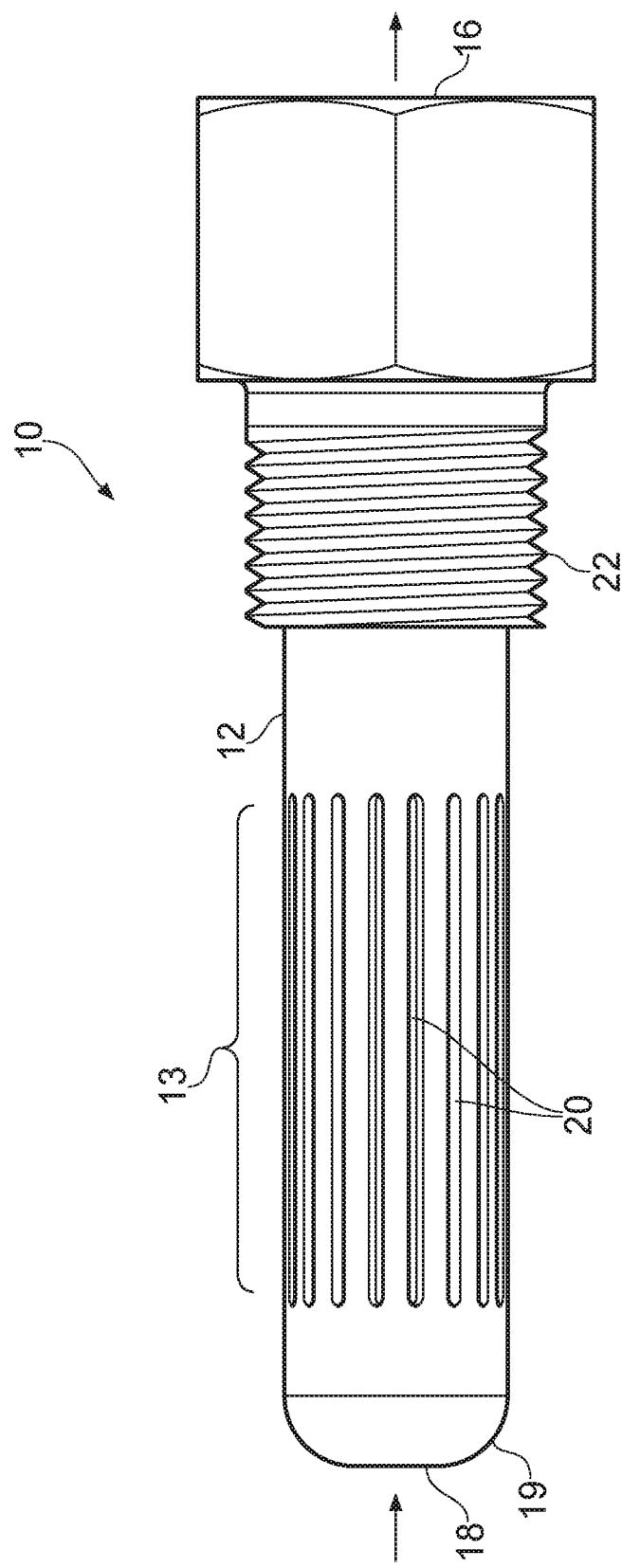
FIG. 1 shows a side view of a filter arrangement in accordance with one aspect of the present invention.
Figure 2:
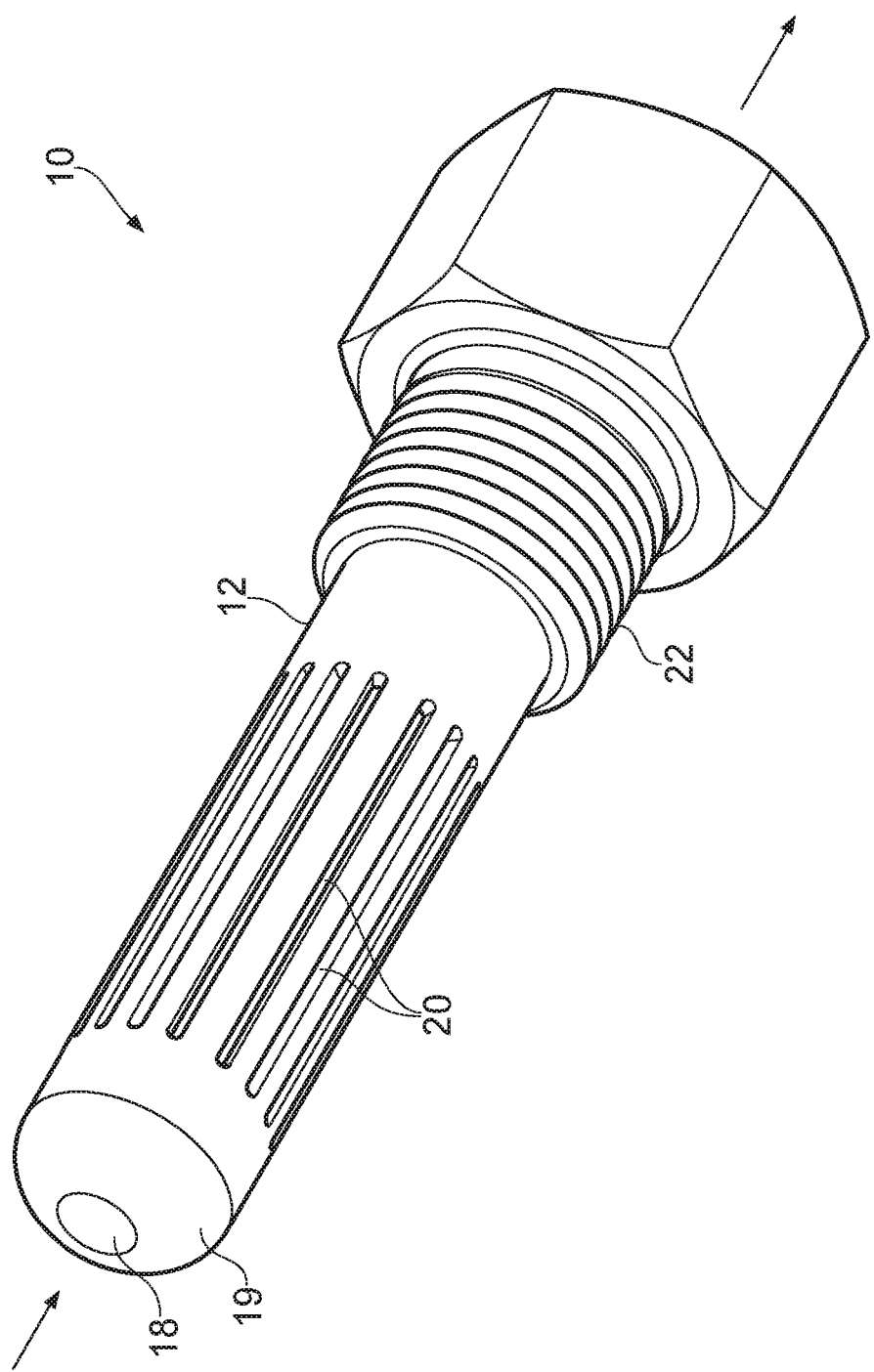
FIG. 2 shows a three-dimensional view of a filter arrangement.

The filter 10 is formed from a tube 12 extending from a first end to a second end. An inlet 18 is positioned through the first end of the tube and the inlet has a cross-sectional area less than the cross-sectional area of the outlet 16 of the tube 12 and normally less than the outlet of an associated nozzle in use.

The inlet 18 also has a cross-sectional area less than the cross-sectional area of the internal bore of the tube 12.

Slots 20 extend longitudinally along the first part of the side wall 13 of the tube 12 from the first end of the tube to a threaded bush 22. The slots are 1 mm and above in width and, in this example, are of a suitable length where two of the slots equals the flow required to give the corresponding K-Factor of the associated nozzle. For such embodiments, the volume of water that will pass through two slots will be greater or equal to the flow required by the nozzle. The K-factor is defined as the flow rate of a nozzle given by $q = K\sqrt{p}$, where q is the flow rate in litres per minute, p is the pressure at the nozzle (or filter) in Bar and K is the K-factor. Consequently, if the inlet 18 becomes blocked, then the slots will allow the correct operating volume of fluid through to the nozzle. The volume required in such embodiments is three times the volume required to feed the nozzle at all times. Therefore, the inlet 18 plus four slots 20 can equal three times the dispersion flow rate of the nozzle. For high viscosity fluids, the slots 20 will be larger in order to reduce blocking. For example, where the fluid is water, the slot width is 1 mm, whereas for foam the slot 20 width is 1.5 mm or greater. The number of slots 20 may be, for example, 4 to 24 or greater depending on the dimensions of the filter 10. In other embodiments, the slots need not provide the flow rate described above for this embodiment.

The filter 10 is adapted to connect to a standard nozzle (not shown) typically used for fire sprinkler systems. Once the filter 10 is connected to a nozzle, the inlet 18 has a cross-sectional area less than the cross-sectional area of the outlet of the nozzle.

A bush thread is provided to connect the filter to a nozzle. In this portion of the filter, the filtering mechanism is dormant, but this portion provides structural support and enables for faster production as this portion requires less machining to manufacture.

The inner chamber of the filter 10 is sized such that the diameter (or other dimension) is matched to the inlet of the nozzle. This allows full flow into the nozzle without restriction to the flow in the inner chamber of the filter 10. This region will be free flowing without debris that would normally block the nozzle's exit orifice.

The benefits of this embodiment are that it can work in any position of pipe from Elbow/Tee/Down Pipe and Up Pipe with it being positioned out with the concentric flow path, the first inlet should be within the ID of the main flow path with the slots being positioned in a debris entrapment area in the pipe line (Elbow Cavity-Tee Cavity-Weld Let Cavity) out with concentric flow path.

This will mean that there will be a reduced risk of operator installation error as NPT threads do not always match up with each other and this can manipulate the positioning of the filters to the concentric flow path. The strength of this filter is also improved as the slots are not the full body length of the internal section of the adaptor, in this embodiment, but are based specifically on two slots to allow the correct flow through to the nozzle, this also enables manufacture time to be reduced without compromise to flow.

Each size of filter is given a K-Factor of its own to ensure that the K-Factor of the nozzle is always achieved when choosing the correct variation for any nozzle with any fluid.

In one example, the inlet 18 has a diameter of approximately 3.9 mm compared with a nozzle outlet diameter of approximately 4 mm and a filter outlet of 14 mm. In an alternative embodiment, if the nozzle has an exit diameter of 10 mm the inlet 18 diameter to the filter is 9.9 mm or less. The inlet 18 and the slots 20, in this embodiment, are sized such that the flow rate through the filter 10 is equal to the flow rate through a tube having an open bore of similar size. Consequently, without wishing to be bound by theory, the flow of fluid through the nozzle is equivalent to the full bore flow rate of an equally sized tube open ended tube.

The first end of the filter 10 is a debris deflector formed in a tapered or dome-shaped end 19 such that the centre of the first end extends longitudinally further than an outer portion of the first end. The shape of the first end of the tube 12 encourages debris flowing through the pipeline to proceed in a flow direction away from the inlet 18.

The curvature of the debris deflector 19 limits the availability of flat areas of impact (i.e. surfaces at substantially 90 degrees to the direction of flow) for flowing debris and encourages debris in the flow to flow beyond the inlet 18. The rounded end section of the filter limits the point of fixture for debris close to the inlet, and any debris flowing in the pipeline is forced around the filter and down past the filter into the debris entrapment area 28 within the pipe (shown in FIGS. 3, 4 and 5). The smooth edge/surface of the debris deflector reduces friction of the filter which propels debris away from the inlet. The cylindrical shape and/or curved surfaces also provide a smoother flow path of water or delivery fluid for example oil or firefighting foam. The cylindrical and/or curved surfaces further reduce the areas where salt crystallisation can begin allowing a free flow area.

Figure 3:
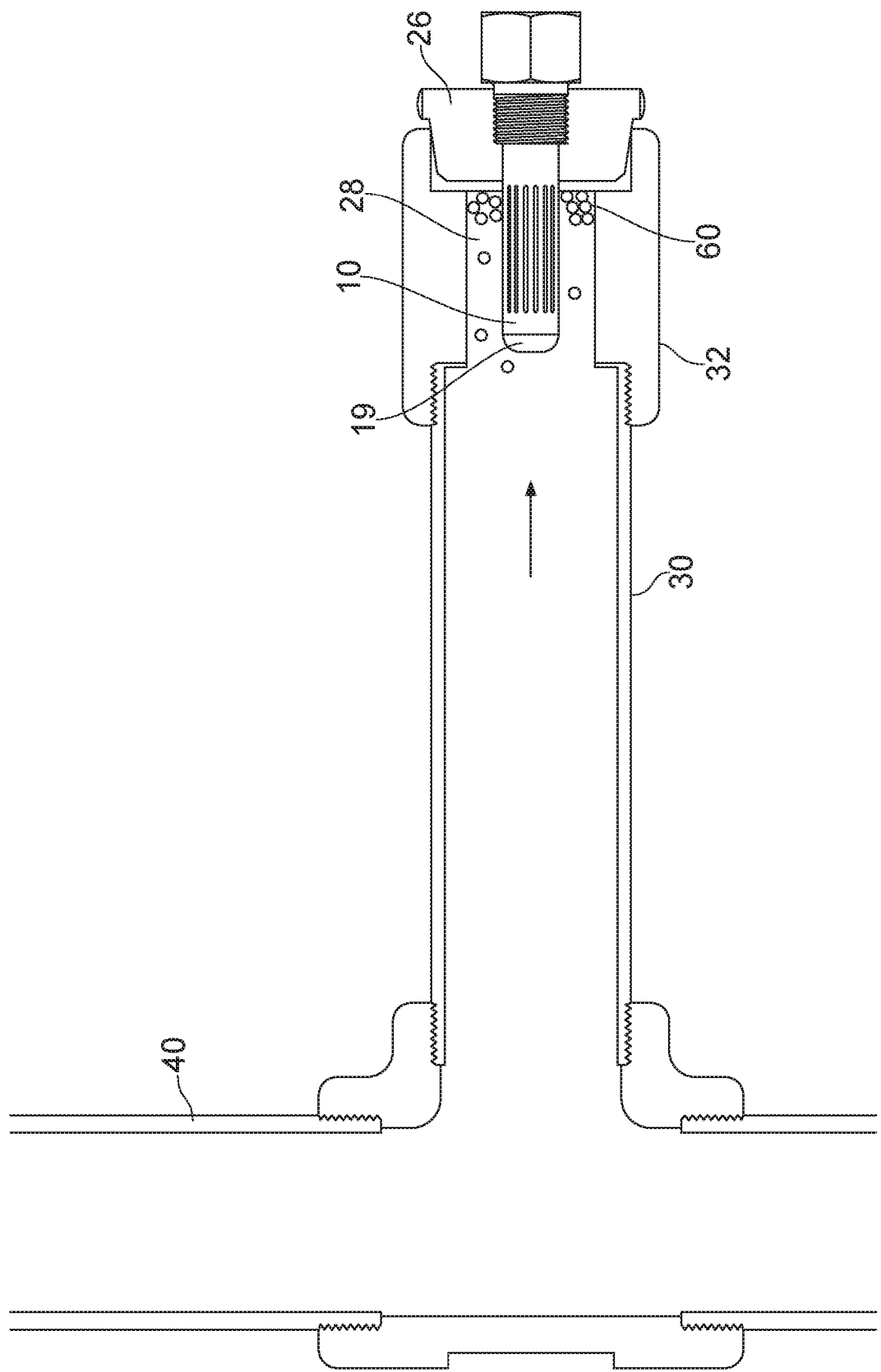
FIG. 3 shows a filter arranged in a pipeline connected with a tubular connector.

FIG. 3 shows the filter 10 arranged in a pipeline 40. The filter 10 is connected to a pipe 30, a tubular coupling 32 and a reducing bush 26. Debris 60 flows around the dome-shaped end 19 of the filter 10 and into the tubular coupling 32. The portion of the tube 12 adjacent to the reducing bush 26 is substantially solid.

The slots 20 extend in a portion of the tube 12 substantially outwith the reducing bush 26. In this example, 95% of the portion of the tube 12 adjacent to the reducing bush 26 is free from slots 20.

The slots 20 are located substantially within the debris entrapment area 28. In use, the debris flows in the pipeline 30, around and down past the filter 10 into the debris entrapment area 28.

Figure 4:
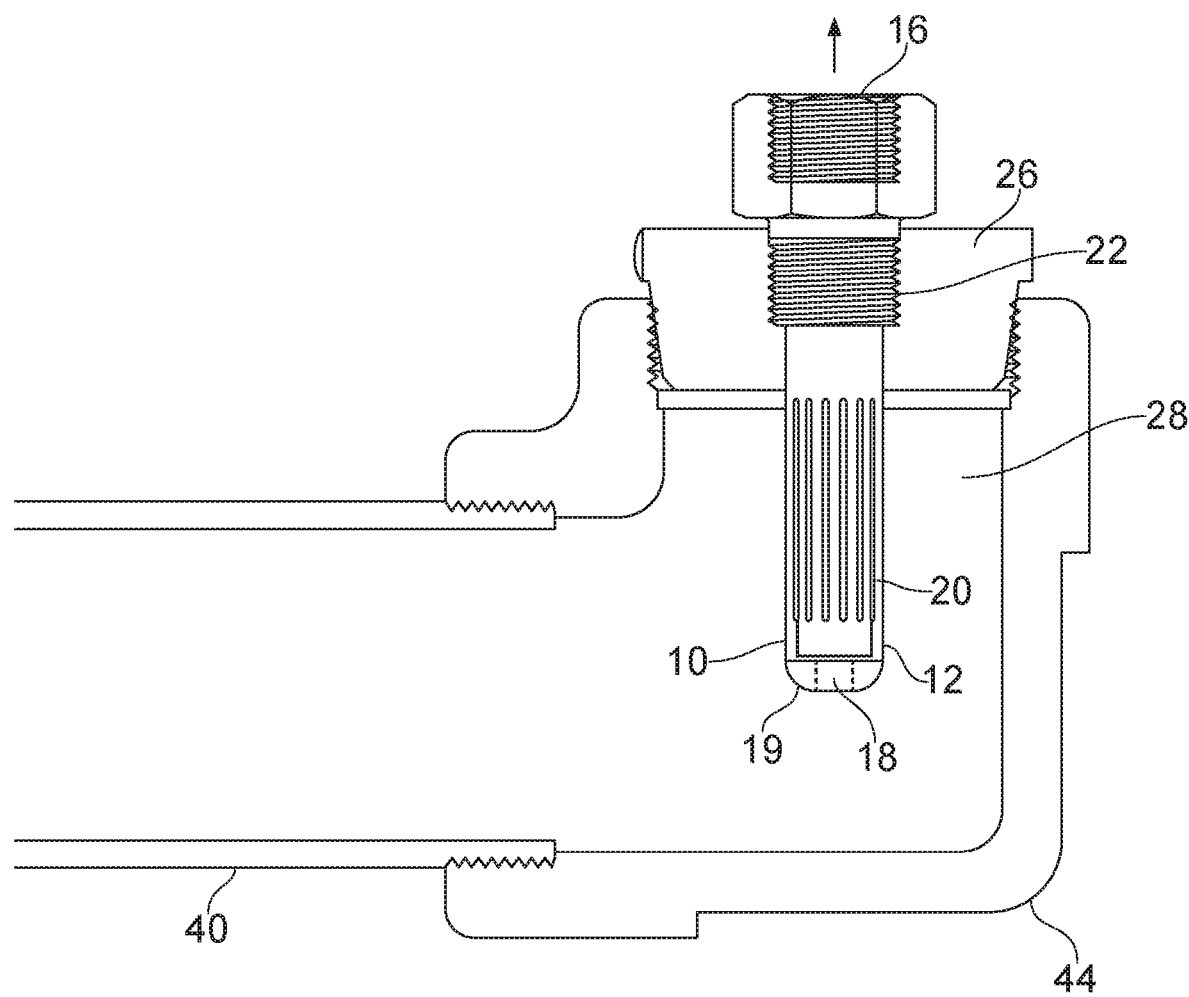
FIG. 4 shows a filter arranged in a pipeline connected with an elbow connector.

FIG. 4 shows the filter 10 arranged in a pipeline 40, connected to the pipeline via an elbow connector 44.

FIG. 5 shows the filter 10 arranged in a pipeline 40, connected to the pipeline via a T-junction connector 42.

With the above-described arrangement small debris that enters the inlet 18 is able to pass freely through the filter 10 and into and out of the nozzle. Because the inlet 18 has a smaller cross-sectional area to the outlet of the nozzle, the risk of blockages in the nozzle caused by flowing debris is significantly reduced.

Additionally, the combination of the inlet 18 and the slots 20 provides the filter 10 with a K-factor equivalent or greater than the K-factor of an open tube of the same dimensions as the tube 12 of the filter 10. The filter 10 filters debris from the flow while maintain full bore flow to the nozzle.

Improvements and modifications may be made, without departing from the scope of the invention.

Various modifications to the detailed designs as described above are possible.

Figure 6A:
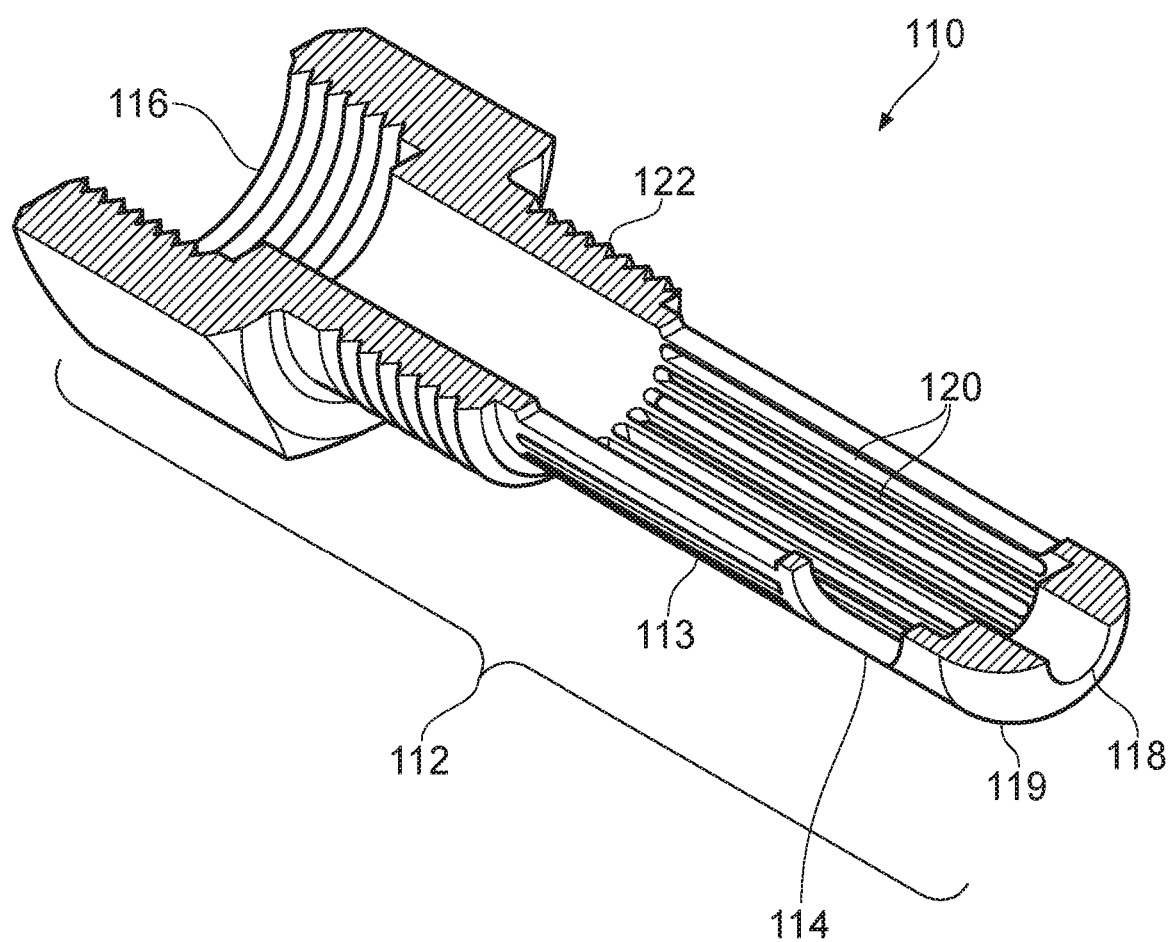
FIG. 6a is a cross-section perspective view of a filter with an inlet located in the side wall in accordance with another aspect of the present invention.

For example, FIG. 6a shows a distinct embodiment of a filter 110 comprising a tube 112 having a bore (not shown) extending therethrough, a side inlet 114 in a side wall 113, an end inlet 118, and an outlet 116. Slots 120 extend longitudinally along the first part of the side wall 113 of the tube 112 from the end inlet to a threaded bush 122.

The threaded bush 122 is a mounting means provided over the tube 112 at the outlet 116 end, and is used to secure in a pipeline or a reducing bush as described further below. An inner thread (not shown) is also provided at the outlet end, for connection to a nozzle.

The end inlet 118 is provided on a dome 119, which extends from the tube 114. The end inlet 118 has a smaller diameter (and therefore cross-sectional area) than the outlet 116. In contrast, the diameter of the side inlet 114 is the same as that as the bore of the tube 114, and the outlet 116.

Moreover, the outlet 116 has a plane which is through the cross-section of the tube 112, at right angles to the main longitudinal axis thereof. Whilst the side inlet 114 is in a side of the tube 112, and has a plane which is generally at right angles to the plane of the outlet 116.

The end inlet 118 has a cross-sectional area the same full bore as a nozzle 150 (shown in FIG. 6b) to be greater than the nozzle's k-factor.

The benefits of such features will become apparent in the following description on in use arrangements.

Figure 6B:
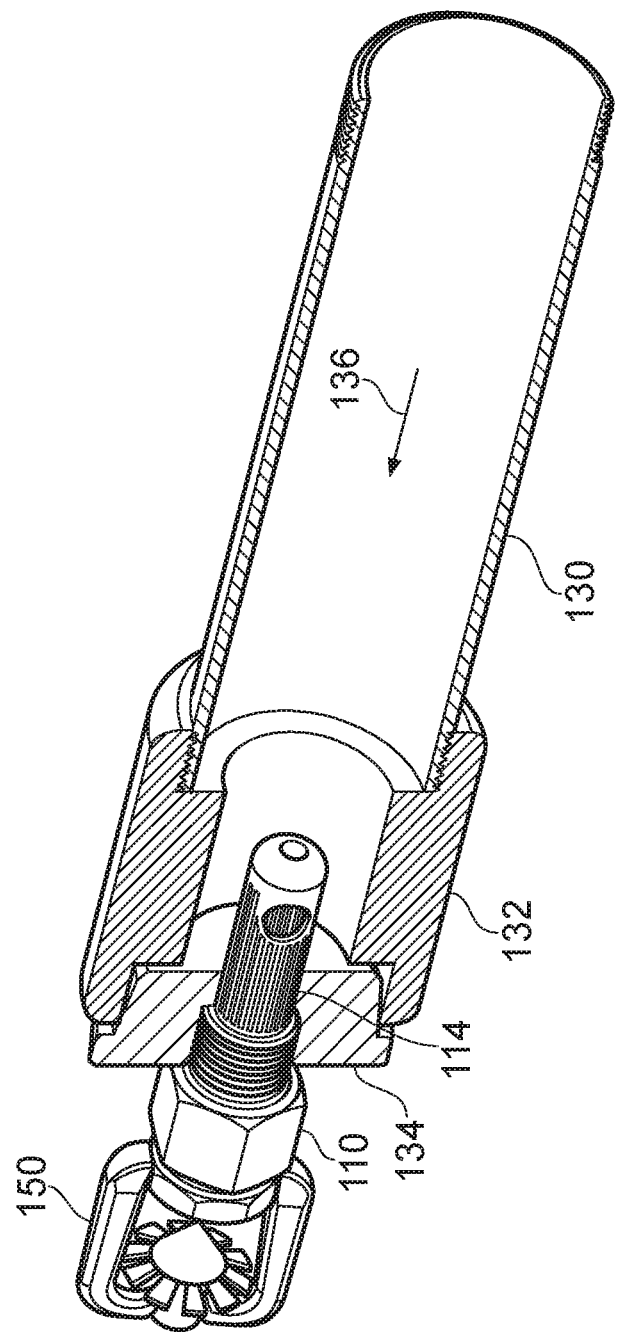
FIG. 6b is a perspective view of the FIG. 6a filter spaced between a pipe shown in cross-section, and a nozzle in a first arrangement.

FIG. 6b illustrates the filter 110 in a pipe 130 via a tubular coupling 132 and reducing bush 134. A nozzle 150 is received into the bore of the tube 112 at the outlet 116 via the internal thread. In use, fluid flows through the pipe 130 in the direction of arrow 136. Large pieces of debris, liable to block the nozzle 150 are inhibited to flow through the most direct inlet (the end inlet 118) because of its reduced size. Debris that can and does flow therethrough tends to be small enough to be less likely to cause blockages in the nozzle 110. But in any case, the dome shape or bevelled edge 119 of the end of the tube 112 also encourages the debris to go past the end inlet 118 and combined with the flow pressure, gather outside of the filter 110, rather than enter the side inlet 114

Fluid flow and pressure, is nonetheless maintained through the side inlet 114, and the slots 120. Thus the embodiment provides the benefit of full bore pressure applied to the nozzle because the inlet 114 is not restrictive in size, but also a reduced likelihood of blockages, because it is orientated at right angles to the outlet 116, i.e. on the side of the tube 112 where debris is likely to pass by, partly driven by in use fluid pressure.

Figure 7A:
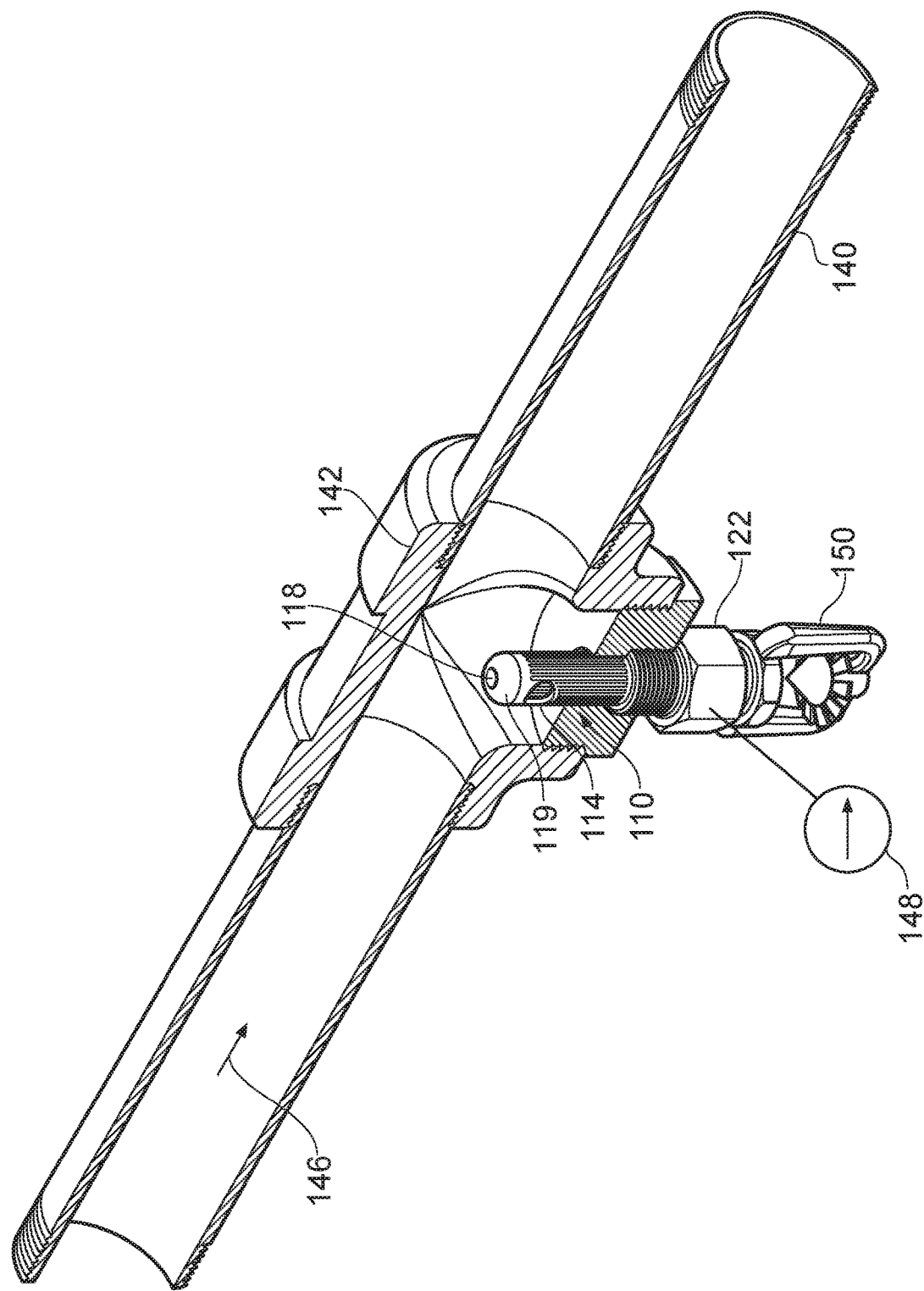
FIG. 7a is a front perspective view of the FIG. 6a filter spaced between a pipe, shown in cross-section, and a nozzle in a second arrangement.
Figure 7B:
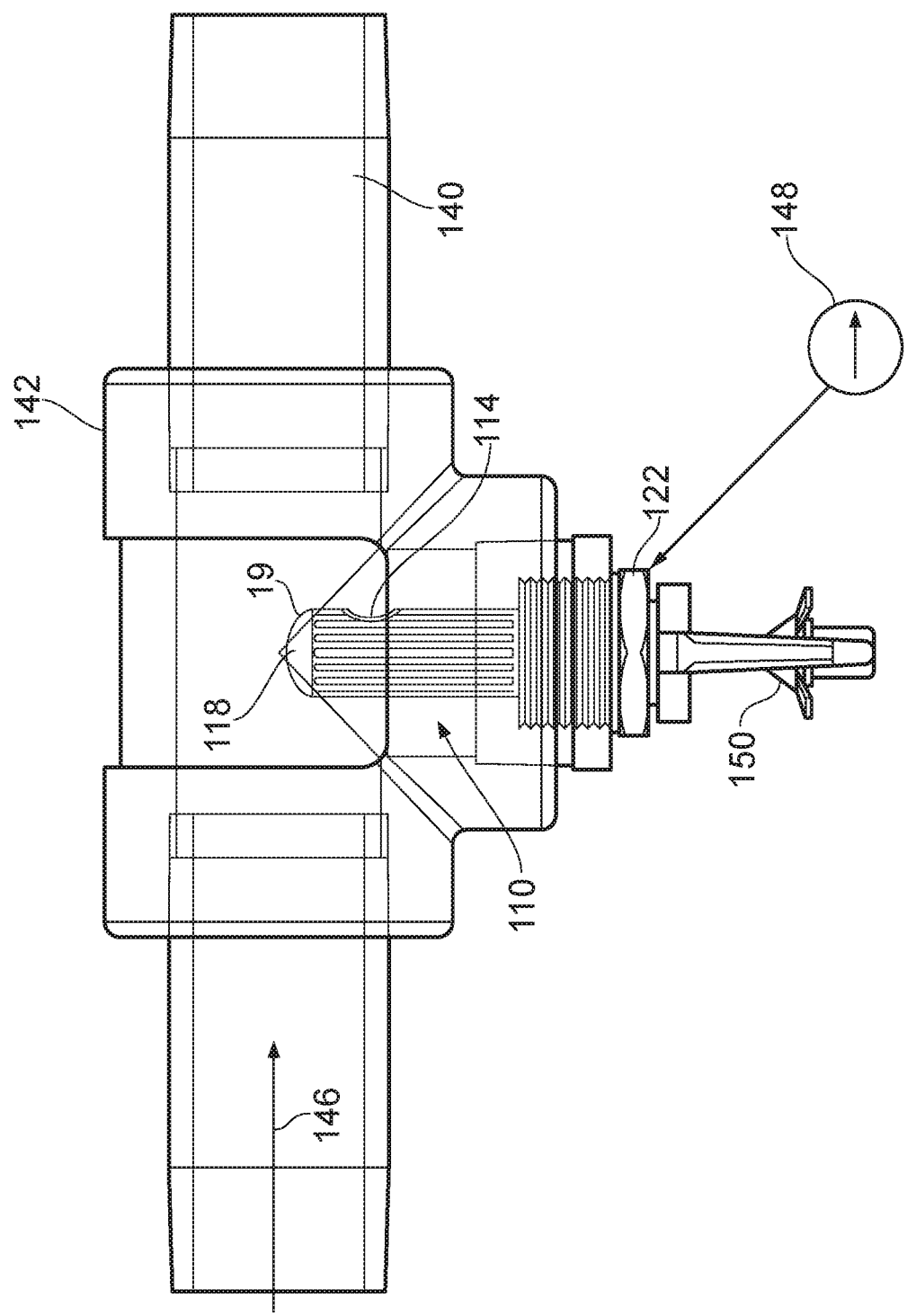
FIG. 7b is a front view of the FIG. 7a filter and pipe in the second arrangement.

In FIGS. 7a and 7b, the filter 110 is provided in a T-piece connector 142 of a pipeline 140. A nozzle 150 is provided within the filter 110 as previously described. The larger (side) inlet 114 is orientated away from the fluid flow through the pipeline, represented by arrow 146. In this way, debris in the fluid is less likely to proceed through the largest inlet (the side inlet 114), and cause blockage problems downstream. In FIG. 7a the inlet 114 is orientated at 90 degrees to the fluid flow 146, in FIG. 7b it is orientated at 180 degrees i.e. opposite the fluid flow. Nevertheless the full bore access of the side inlet 114 maintains flow rate and pressure to the nozzle 150.

The filter 110 is positioned within the T-piece connector 142 such that the end of the tube 112 is slightly below the concentric flowpath of the pipeline 140, or alternatively, just below the longitudinal axis of the pipeline 140. In this manner, the entrapment area for debris flowing in the pipeline is maximised in the T-piece connector 142 arrangement of the pipeline 140 in the region between the slots 120 and the pipeline 140.

An indicator arrow 148 is provided on the outer face of the bush 122 which corresponds with the orientation of the side inlet 114. Accordingly a user fitting the nozzle 150 and filter 110, will know the rotational position of the side inlet 114 from the indicator arrow 148, and can position relative to the flow direction.

Figure 8:
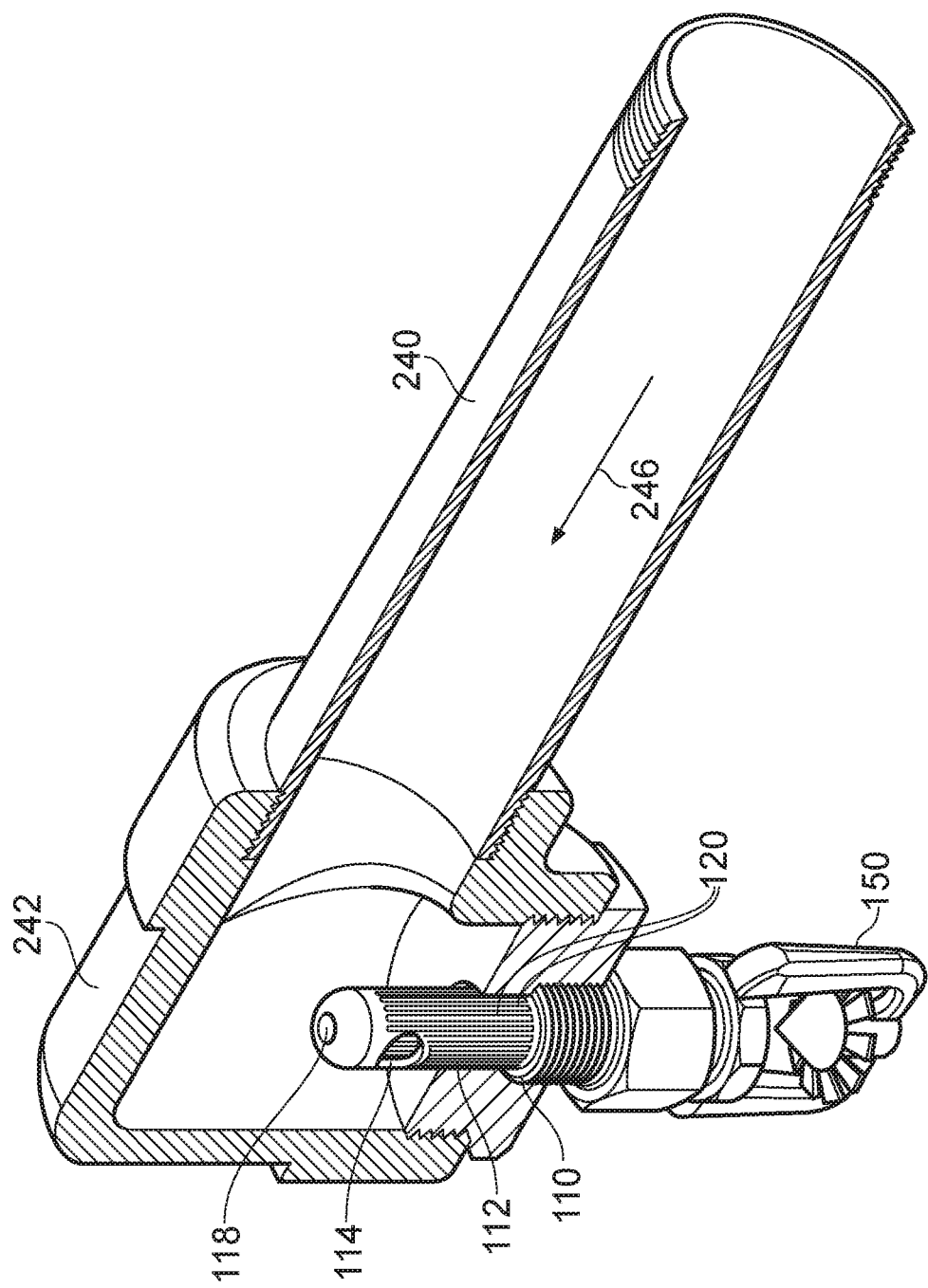
FIG. 8 is a perspective view of the FIG. 6a filter spaced between an elbow connector connected to a pipe, shown in cross-section, and a nozzle in a third arrangement.

FIG. 8 illustrates the filter 110 is provided in an elbow adapter 242 of a pipeline 240. The nozzle 150 is provided within the filter 110 as previously described. The larger (side) inlet 114 is orientated at ninety degrees to the fluid flow through the pipeline, represented by arrow 246. A smaller end inlet 118 is provided at an end of the tube 112. Debris in the fluid is less likely to proceed through the largest inlet (the side inlet 114), and cause blockage problems downstream because the debris flows between the slots 120 and the inner face of the elbow adaptor 242. Even when debris is present in this region, the side inlet 114 maintains flow rate and pressure to the nozzle 150.

Furthermore, deposits such as scale and marine growth build up concentrically within the pipeline, and may inhibit flow along the pipeline. The deposits may eventually break off and flow within the pipeline towards the filter 110. Typically, any debris flow toward the slots and the debris is less likely to flow through the side inlet 114.

The filter is positioned within the elbow connector such that the end of the tube 112 is slightly above the centre of the pipeline, or alternatively, positioned just above the longitudinal axis of the pipe.

Figure 9:
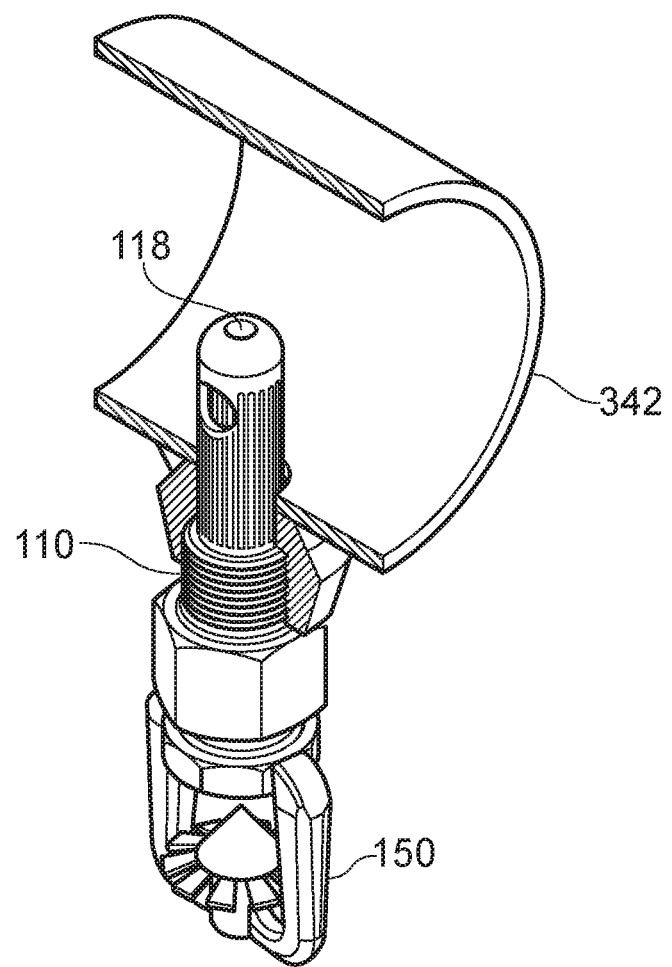
FIG. 9 is a perspective view of the FIG. 6a filter spaced in between a weld let adaptor in a pipe, shown in cross-section and a nozzle in a fourth arrangement.

In FIG. 9, the filter 110 is provided in a weld let adaptor 342 of a pipeline. A nozzle 150 is provided within the filter 110 as previously described, and its second inlet 118 slightly below the central axis of the pipe 342.

Depending on the dimensions of the pipeline, and the nozzle, a variety of couplings, and reducing bushes may or may not be used, as required, to fit the nozzle to the pipeline.

Certain embodiments use the filter without a nozzle such as between individual pipe joins in a pipeline.

The invention claimed is:

1. A filter for a fire-fighting or fire-containment sprinkler system comprising:
   a tube extending from a first end to a second end, the tube having a bore with an internal cross-sectional area;
   an inlet to the tube, the inlet having an inlet cross-sectional area and an inlet diameter;
   an outlet from the tube proximate the second end, the outlet having an outlet cross-sectional area, at least one portion of the outlet being coaxial with the inlet;
   a plurality of further inlets in the tube between an outside thereof and the bore;
   the tube comprising a threaded nozzle connector proximate the outlet;
   the tube comprising a threaded pipeline connector located between the first end and the outlet, the threaded pipeline connector being on the outside of the tube;
   wherein the inlet cross-sectional area is less than the outlet cross-sectional area;
   wherein the filter is a single piece;
   wherein the further inlets comprise a plurality of slots extending parallel to a longitudinal direction from the first end of the tube to the second end of the tube, the plurality of slots having a dominant longitudinal dimension;
   wherein at least some of the further inlets are located longitudinally between the inlet and the pipeline connector; and
   wherein each of the further inlets has a width in a direction generally perpendicular to the longitudinal direction that is less than the inlet diameter.

2. A filter according to claim 1, wherein the inlet cross-sectional area is less than the internal bore cross-sectional area.

3. A filter as claimed in claim 1, wherein the combination of the inlet and the plurality of further inlets provides a K-factor equivalent or greater than the K-factor of an open tube of the same dimensions as the tube of the filter.

4. A filter as claimed in claim 1, wherein the first end is tapered such that a center of the first end extends longitudinally further than an outer portion of the first end.

5. A filter as claimed in claim 1, wherein the first end is dome-shaped.

6. A filter as claimed in claim 1, wherein the further inlets extend for up to 75% of the length of the tube.

7. A filter as claimed in claim 1, wherein there are at least 4 further inlets.

8. A filter as claimed in claim 1, wherein the width of the further inlets is at least 1 mm.

9. A filter as claimed in claim 1, wherein spacing between the further inlets is 50%-150% larger than the width of the further inlets.

10. A filter as claimed in claim 1, wherein the cross-sectional area of the inlet has a height to width ratio of at most 2:1.

11. A nozzle apparatus, comprising a filter as claimed in claim 1, and a nozzle with a nozzle outlet, the nozzle outlet having a nozzle outlet cross-sectional area.

12. A nozzle apparatus as claimed in claim 11, wherein the inlet cross sectional area is less than the nozzle outlet cross-sectional area.

13. A nozzle apparatus as claimed in claim 11, wherein the further inlets are of a length where two in combination equals or exceeds the flow required to give the corresponding K-Factor of the nozzle.

14. A filter as claimed in claim 1, wherein the internal cross-section area of the tube is the same along at least 75% of its length.

15. A filter as claimed in claim 14, wherein the internal cross-section area of the tube is the same along at least 95% of its length.

16. A filter as claimed in claim 1, wherein the pipeline connector comprises a threaded outer body provided around the tube, with a wider outer diameter compared to the tube.

17. A filter as claimed in claim 1, wherein the nozzle connector comprises a threaded bore with a wider inner diameter compared to the bore of the tube.

18. A filter as claimed in claim 1, wherein the pipeline connector comprises a threaded outer body and the nozzle connector comprises a threaded bore, and wherein the inner diameter of the threaded bore of the nozzle connector, and the outer diameter of the threaded outer body of the pipeline connector, are the same diameter.

19. The filter of claim 1, wherein the inlet is located closer to the first end of the tube than to the second end of the tube.

20. The filter of claim 1, wherein the inlet is circular and the inlet diameter is the diameter of the circular inlet.

21. The filter of claim 1,
wherein the inlet cross-sectional area is at least 75% of the internal cross-sectional area; and
wherein a ratio of the inlet diameter to the width of one of the further inlets is at least 3.9:1.

22. A fluid filter comprising:
a tube extending from a first end to a second end;
an inlet to the tube, the inlet having an inlet cross-sectional area and an inlet limiting dimension, the inlet limiting dimension representing a minimum spacing between opposing points along a perimeter delineating the inlet;
an outlet from the tube, the outlet having an outlet cross-sectional area;
a plurality of further inlets in the tube between an outside thereof and the bore;
the tube including external threads exclusively helically circumscribing a longitudinal portion of the bore devoid of an internal flange operative to decrease cross-sectional area of the bore;
wherein at least some of the further inlets are located longitudinally between the inlet and the external threads;
wherein each of the further inlets has a further inlet width in a direction generally perpendicular to the longitudinal direction;
wherein a ratio of the inlet limiting dimension to the further inlet width of one of the further inlets is at least 3.9:1; and
wherein the inlet cross-sectional area is at least 75% of the internal cross-sectional area.

23. The filter of claim 22, wherein the inlet is circular and the inlet limiting dimension is a diameter of the circular inlet.

* * * * *